(12) United States Patent
Harris

(10) Patent No.: US 7,128,419 B2
(45) Date of Patent: Oct. 31, 2006

(54) OPERATOR SUPPORTED REMOTE CAMERA POSITIONING AND CONTROL SYSTEM WITH IMPROVED HANDLE MODULE

(76) Inventor: Thomas H. S. Harris, 223 Union St., #1, Brooklyn, NY (US) 11231

( * ) Notice: Subject to any disclaimer, the term of this patent is extended or adjusted under 35 U.S.C. 154(b) by 0 days.

(21) Appl. No.: 11/076,635

(22) Filed: Mar. 10, 2005

(65) Prior Publication Data

US 2005/0157210 A1    Jul. 21, 2005

Related U.S. Application Data

(63) Continuation of application No. 10/387,192, filed on Mar. 11, 2003, now Pat. No. 6,923,542.

(51) Int. Cl.
G03B 17/00    (2006.01)
G03B 21/00    (2006.01)

(52) U.S. Cl. .................. 352/243; 396/420; 396/421
(58) Field of Classification Search ............... 352/243; 396/419, 420, 421; 348/376
See application file for complete search history.

(56) References Cited

U.S. PATENT DOCUMENTS

| 4,530,580 A | | 7/1985 | Ueda et al. |
| 4,727,390 A | | 2/1988 | Brown |
| 5,065,249 A | * | 11/1991 | Horn et al. ................. 348/376 |
| 5,454,042 A | * | 9/1995 | Drever ....................... 381/362 |
| 5,508,735 A | * | 4/1996 | Mueller ....................... 348/82 |
| 5,737,657 A | | 4/1998 | Paddock et al. |
| 6,038,364 A | | 3/2000 | Koyama et al. |
| 6,056,450 A | * | 5/2000 | Walling ..................... 396/428 |
| 6,217,236 B1 | | 4/2001 | Chapman |
| 6,752,541 B1 | * | 6/2004 | Dykyj ........................ 396/428 |

* cited by examiner

*Primary Examiner*—Rodney Fuller
(74) *Attorney, Agent, or Firm*—Akerman Senterfitt

(57) ABSTRACT

A remote camera positioning and control system is disclosed that permits a sole operator to use and support a camera out of arm's reach. The system can include a handle module that incorporates, for example, an axially and rotationally moveable grip and a proximal handle grip ring and control cage for surrounding a camera control, such as a joystick.

16 Claims, 11 Drawing Sheets

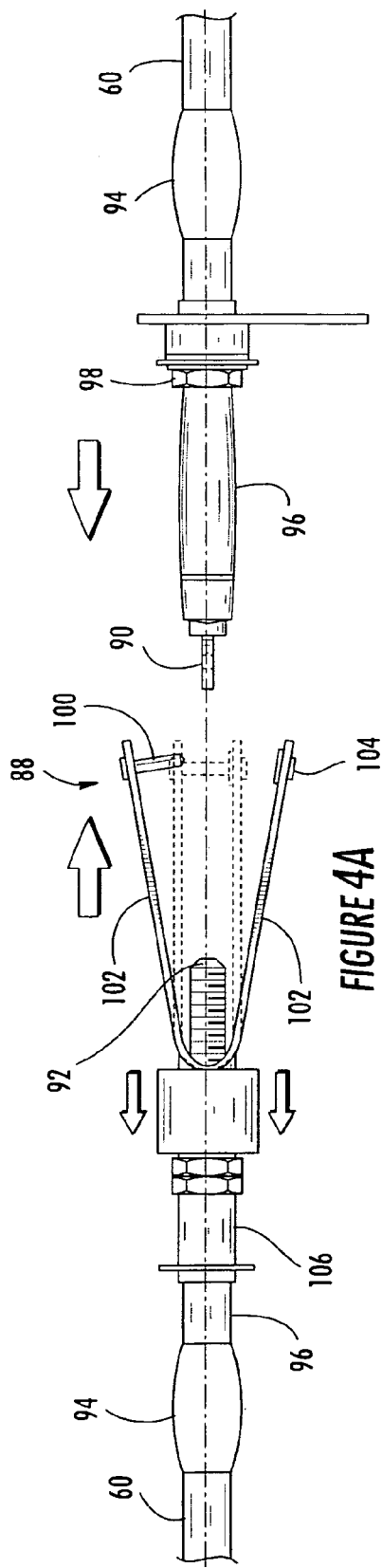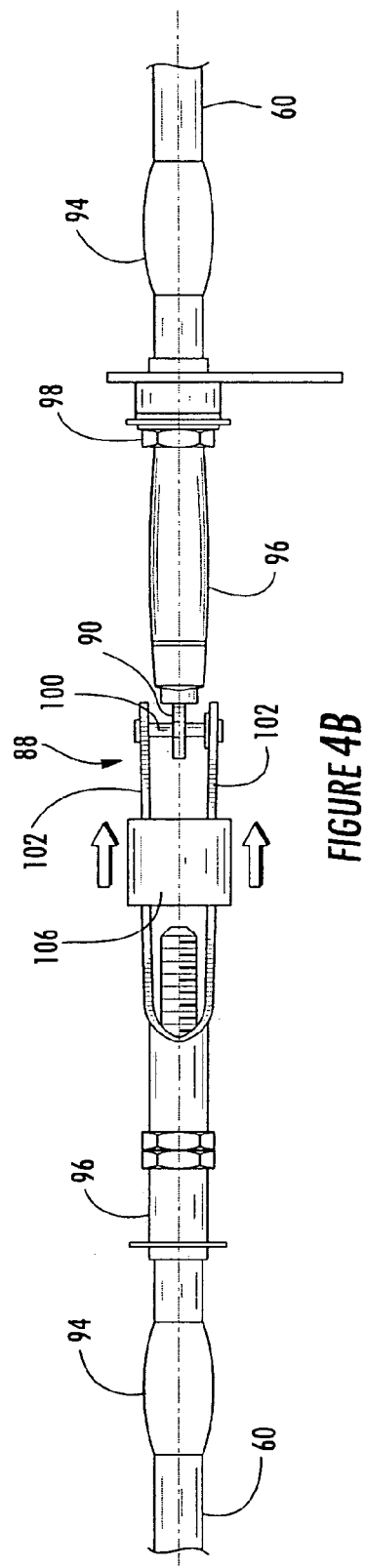

OPERATOR SUPPORTED REMOTE CAMERA POSITIONING AND CONTROL SYSTEM WITH IMPROVED HANDLE MODULE

CROSS-REFERENCE TO RELATED APPLICATION

This application is a continuation of prior application Ser. No. 10/387,192 filed Mar. 11, 2003 now U.S. Pat. No. 6,923,542.

FIELD OF THE INVENTION

The invention relates to camera supports. More particularly, the invention relates to supports for remotely positioning cameras.

BACKGROUND OF THE INVENTION

In cinema graphic and other visual art endeavors, it is often desired to increase the range of viewing perspectives, to obtain various special effects and capture scenes from angles and elevations that are not available from a camera on a tripod or held by a camera man. This is particularly true in the recording of sporting events. Various systems have been developed to address these goals, including elevating and pivoting boom arms, as shown, for example, in U.S. Pat. No. 4,849,778, and steady cam mounts for aircraft, as shown, for example, in U.S. Pat. No. 4,156,512.

While these approaches do increase the range of viewing angles and elevations, they often involve complicated componentry that is typically difficult to operate by a cameraman alone and is almost certainly too large to be held and maneuvered by a cameraman alone. The size and weight of the equipment often limits access to desired viewing and recording areas.

It would therefore be advantageous to provide a remote camera positioning system that is capable of being supported, operated and maneuvered by a sole cameraman.

SUMMARY OF THE INVENTION

The subject matter of the invention presents various features that can be combined in different combinations and with varying degrees of details to provide improvements to a remote camera positioning and control system. The various combinations of features preferably provide a remote camera positioner that can used and supported by a sole operator with no external structural or personnel support. With certain combinations of features, a remote camera positioner can be arranged that is controlled and physically supported only through the operator's hands, with auxiliary systems, such as power supplies, video monitoring and video recorder being mounted on the user.

It is desirable for a remote camera positioning system having features according to aspects of the invention to be sufficiently light-weight to be borne and readily maneuvered by a sole operator, but have sufficient flexural rigidity to resist the various deflections that can be induced by loads created with the camera movements and by external forces. Various combinations of features according to principles of the invention can provide a balance between such light-weightiness and flexural rigidity to enable sole operator use and control in a self-contained manner.

One embodiment having a combination of features according to aspects of the invention is a remote camera positioning system for use and support by a sole operator, having a camera positioner with a distal camera mount for supporting a camera, a camera positioner having a proximal operator interface to enable an operator to support a camera positioner and spatially maneuver the camera through the camera positioner, wherein the positioner includes at least one elongated beam module. The beam module of this embodiment is positioned distally of the operator interface and proximally of the camera mount and has a plurality of discrete longerons radially displaced from the neutral axis of the beam module and extending substantially parallel to the neutral axis. In this embodiment, the cross-sectional flexural rigidity of the beam module decreases distally toward the camera from a first cross-sectional flexural rigidity to a second cross-sectional flexural rigidity.

In another embodiment, the cross-sectional flexural rigidity of the beam module increases distally to a third cross-sectional flexural rigidity that is greater than said second cross-sectional flexural rigidity and then decreases distally to a fourth cross-sectional flexural rigidity. In another variation of combined features, the first cross-sectional flexural rigidity and the third cross-sectional flexural rigidity can be substantially the same and the second cross-sectional flexural rigidity and the fourth cross-sectional flexural rigidity can be substantially equal. Still another possibility is that the first cross-sectional flexural rigidity is greater than the third cross-sectional flexural rigidity, and optionally, at the same time, the second cross-sectional flexural rigidity can be greater than the fourth cross-sectional flexural rigidity.

In another embodiment having features according to aspects of the invention, the beam module can include, instead of just one beam module, multiple beam modules, for example, a proximal beam module and a separate distal beam module. In such an arrangement, the first cross-sectional flexural rigidity and the second cross-sectional flexural rigidity could occur along the length of the proximal beam module and the third cross-sectional flexural rigidity and the fourth cross-sectional flexural rigidity could occur along the length of the distal beam module.

Another feature according to aspects of the invention is that at least one of the multiple beam modules can have an anchor brace region and a stabilizing web region. The anchor brace region can include at least one anchor brace extending substantially longitudinally and transversely joining adjacent ones of the plurality of longerons, and the stabilizing web region can include at least one stabilizing web extending substantially longitudinally and transversely joining adjacent ones of the plurality of longerons. In such a possible construction, the first cross-sectional flexural rigidity can occur across the anchor brace of a proximal beam module; the second cross-sectional flexural rigidity can occur across the stabilizing web of the proximal beam module; the third cross-sectional flexural rigidity can occur on the anchor brace of the distal beam module and the fourth cross-sectional flexural rigidity can occur on the stabilizing web of the distal beam module.

The flexural rigidity in the anchor braces can decrease by reducing the thickness of the anchor braces located at more distal locations toward the camera. Similarly, the thickness and density of the stabilizing web material can be reduced to decrease the cross-sectional flexural rigidity at more distal locations towards the camera. Another possibility, either alone or in combination with these two techniques, is to reduce the diameter or other cross-sectional detail of the longerons.

In another embodiment having features according to aspects of the invention, the longerons can extend substantially the entire length of the beam module. Alternatively, the longerons can be removably connected between adjacent beam modules. The longerons and the associated beam modules can even be removably connected by hand adjustable connectors to avoid the need for tools and to provide the ability to fine tune the parallel arrangement of the longerons along the length of the positioner.

In another embodiment having features according to aspects of the invention, each anchor brace region includes at least three anchor braces joined to provide a polygonal cross section to the respective anchor brace region. Another possible feature is that each stabilizing web region includes at least three panels of low density material joined to provide a polygonal cross section to the respective low density stabilizing web region. The polygonal cross section could be triangular.

Another possibility is that each anchor brace and each stabilizing web is disposed away from the neutral longitudinal axis of the beam module.

The anchor brace can be constructed in a variety of ways so long as it contributes to the cross-sectional flexural rigidity of the beam module at the given location and assists in maintaining the longerons in the spaced and parallel arrangements. One possible anchor brace construction can include specially shaped laminated wood webs extending between and connecting adjacent longerons. Similarly, the stabilizing webs can be provided by low density panels, made for example of expanded polypropylene (EPP), although other web materials capable of assisting in maintaining longeron spacing and parallel alignment can be used. In some embodiments having features according to aspects of the invention, the stabilizing web of low density material is constructed as a plurality of panels, with each of the panels having a greater thickness and lower density than the adjacent anchor braces.

The longerons can each be constructed as a pull-truded carbon fiber composite tube. Other constructions for arranging stiffening material such as carbon fiber in parallel axial streams or channels and displaced from the neutral axis are also possible according to aspects of the invention.

Other embodiments having one or more features according to aspects of the invention can include a camera mount in the form of a front end module for moveably mounting the camera to the distal beam module. The front end module can include a pan/tilt assembly and a pan/tilt support assembly. The pan/tilt support assembly can connect to the distal beam module and supports the pan/tilt assembly. The pan/tilt assembly supports the camera and permits the optical axis of the camera to pan and tilt relative to the longitudinal axis of the distal beam module.

In one preferred arrangement, the pan/tilt support assembly includes a pan drive platform connected to and extending substantially longitudinally from a distal-most end of a beam module to a pan bearing head. The pan/tilt assembly can then rotatably depend from the pan bearing head, transverse to the longitudinal axis of the positioner. One or more support legs can also be provided to connect to and extend from the beam module and connect to the pan drive platform substantially adjacent to the pan bearing head.

In the case of a triangular beam module, the pan/tilt support assembly can transition from a three-point junction with the beam module to a unified junction with the pan bearing head. The pan bearing head can optionally and preferably include support flanges for connecting the pan bearing head to the pan drive platform. Another variation in the embodiment can provide lateral support struts depending from and extending along the length direction of the pan drive platform. Such a pan/tilt support assembly could include angle brackets and anchor plates for connecting the pan drive platform and the support legs to respective longerons of the beam module. Lateral stiffeners in the form of cross bars or wires can also be extended between two or more of the pan drive platform and the support legs.

An embodiment having one or more features according to aspects of the invention could include a pan drive assembly including a pan drive motor mounted on the pan drive platform, a pan drive sprocket rotated by the pan drive motor, a pan drive chain driven by the pan drive sprocket, a pan axle gear disk driven by the pan drive chain, a pan axle rotatably mounted on the pan bearing head and rotated by the pan axle gear disc; and a pan-tilt hanger plate attached to the pan axle for mounting the pan/tilt assembly. Additionally, a pan drive mounting and tensioning plate, moveably mounted on the pan drive platform to adjust the tension in the pan drive chain, could be provided.

Another embodiment having features according to aspects of the invention can include a pan/tilt assembly having a pan carriage rotatably attached to the pan bearing head; a tilt carriage supported by the pan carriage; and a tilt drive assembly including a tilt drive motor on the tilt carriage; a tilt drive sprocket; a tilt drive chain and a tilt drive gear disc, all interconnected to rotate the tilt carriage and the motor assembly therewith. The embodiment could also have a tilt drive motor mounting plate for supporting the tilt drive motor and tilt drive sprocket, with the tilt drive motor mounting plate being adjustably connected to the tilt carriage for adjusting the tension of the tilt drive chain.

Another embodiment having features according to aspects of the invention can include a pan carriage shaped as a channel with a base and two transversely extending flanges. The base can be connected to the pan bearing head and the tilt carriage can be rotatably mounted between the two flanges. The tilt can also be shaped as a channel with a base and two transversely extending flanges, with the camera being mounted to the base and the two flanges being rotatably mounted to the flanges of the pan carriage. The carriages can be constructed of laminated wood with the tilt carriage optionally being thinner than the pan carriage.

Another embodiment having features according to aspects of the invention can include a user interface that provides a handle module. The handle module can include a handle shaft extending proximally from the beam module and a handle grip moveably mounted in the handle shaft. The handle grip can be slidingly or rotatably mounted on the handle shaft, or both. The handle module could further include a grip ring mounted adjacent a proximal terminus of the handle shaft for rotating the positioner.

The handle module could also include a manual control for at least one of camera tilt and camera pan enclosed within a control cage at its proximal end. The control cage can provide a hollow interior, with the camera control being placed in the hollow interior of the control cage but accessible by the operator's hand while interfacing with the positioner. This camera control could be a joystick. The control cage can be defined by peripherally spaced ribs operatively connected to the handle shaft, with the ribs providing gaps between them and an open proximal end.

Another embodiment having features according to aspects of the invention can include a beam module providing at least one base plate at the proximal end of its anchor brace region and a handle terminus plate more distally within the anchor brace region. The handle can be secured by the base plate and the handle terminus plate. The beam module could include a base plate assembly, with the base plate assembly including a proximal plate and a distal base plate compressing a foam pad to fix the base plates against translation along the handle shaft through friction fit with the foam pad. In another arrangement having features according to aspects of the invention, one of the proximal base plate and the distal base plate is larger than the other, the larger one providing mass reducing holes that also provide additional operator interface surfaces.

A handle module could further include a second manual camera control for controlling one of pan and tilt, and an adjustable camera control mount connected to the base plate assembly, with the second manual camera control being mounted to the camera control mount and positionally adjustable relative to the handle shaft.

Another embodiment having features according to aspects of the invention can include hand adjustable connectors between the various adjustable and disassemble-able components of the positioner to permit field adjustments and assembly and disassembly without tools. Most, if not all, of the hand adjustable fasteners could be nylon to reduce the mass of the positioner. Nylon fasteners can also provide "weak points" that can break away under impact with foreign objects before more expensive components are damaged by the collision.

Another embodiment having features according to aspects of the invention can include various auxiliary systems, such as a VCR, an operator mounted monitor, preferably in the form of goggles, a camera motion control unit and a camera control unit as well as a battery pack, all arranged to be stored and mounted on the user through a support garment, such as a vest. The various units can be connected to each other and to the camera, controls and drives on the positioner through various cabling.

BRIEF DESCRIPTION OF THE DRAWINGS

FIG. 4A is an example of a connection system for the exemplary longerons illustrated in FIG. 2 in a disconnected configuration;

FIG. 4B is an example of a connection system for the exemplary longerons illustrated in FIG. 2 in a connected configuration;

DETAILED DESCRIPTION OF EXEMPLARY EMBODIMENTS AND PREFERENCES

Figure 1:
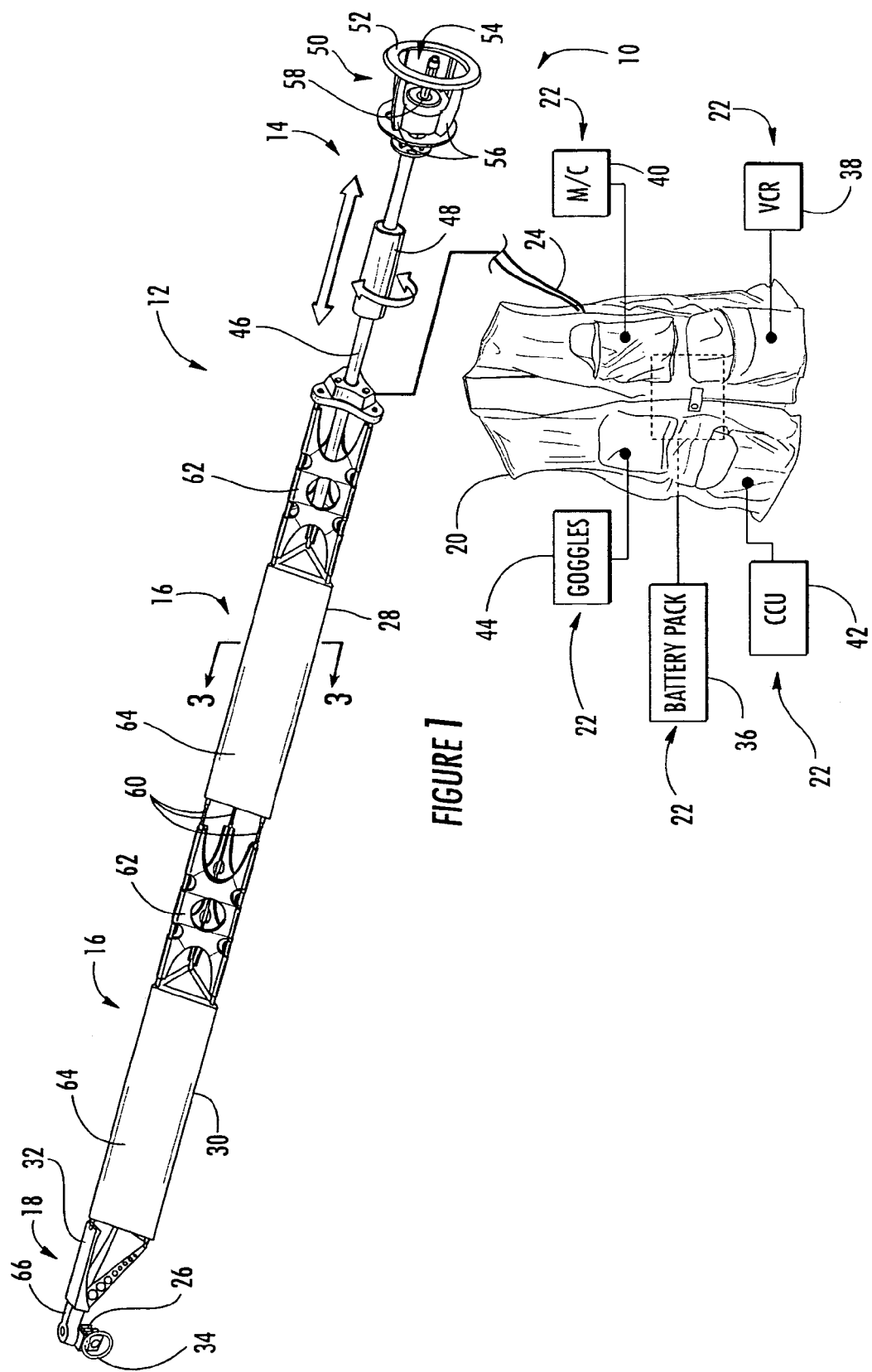
FIG. 1 shows a proximal perspective view of an example of an entire remote camera positioning and control system with an adjacent support vest, presenting features according to aspects of the invention.

The subject matter according to aspects of the invention is directed to camera supports. Camera supports according to aspects of the invention can be held, maneuvered and controlled by a single operator. Such camera supports can be hand-held, or can be partially supported by the operator's body while being hand-held. The camera supports in various configurations, disclosed herein as examples, can provide remote placement of the camera from the operator at substantial distances, permitting optical axis placement and pointing from significant heights and wide lateral positions. Additionally, the remote positioning provided by the camera supports and provides a large range of motion, unhindered by equipment, such as a tripod or dolly, that can be either stationary or limited in their mobility. Instead, camera supports according to principles of the invention enjoy the same degree of mobility and maneuverability as the operator who supports and controls them. Superimposing within the camera support structure itself, motion control of the camera, such as pan and tilt, on the range and degree of motion provided by the camera support can provide an expanded degree of camera placements and field of view, with resulting enhanced image dynamics.

Prior to describing embodiments having features according to aspects of the invention, some notes on the language used herein are in order. Throughout this specification, reference is made to embodiments and various structure and operations as "exemplary," which is intended to simply characterize the subject matter as an example or as illustrative, but not necessarily the best of its kind. The following disclosure with reference to the figures of drawing is intended solely for illustrative purposes and not as limiting the scope of the subject matter of the invention to the disclosed examples. Referring generally to the figures of drawing and in particular to FIG. 1, an exemplary embodiment of portions of a remote camera positioning and control system having features according to aspects of the invention is shown. In general, the system 10 includes a positioner 12 having a handle module 14, a beam module 16, and a front end module 18, for supporting a remotely placed camera. Auxiliary systems can also be provided and worn by the operator, using, for example, a vest 20. Auxiliary sub-systems 22 can be interconnected to each other and to associated components on the positioner using cabling 24. Further details of system parts are discussed more fully below.

Referring to FIG. 1, an embodiment having features according to aspects of the invention is shown. The exemplary camera positioning and control system 10 includes generally a series of interconnected sections or modules 14, 16, 18 that together form a boom 12 for suspending a camera lens and detector 26 at the remote distal end for positioning and control by the handle module 14 at a proximal end. Between the camera 26 and the handle module 14, the boom 12 is constructed of one or more beam modules 16 which can include a proximal beam module 28 and a distal beam module 30. Although two beam modules 16 are illustrated, one beam module can be utilized or three or more beam modules can be utilized depending on the desired length for the boom 12. For purposes of this specification, the beam module adjacent the handle module 14 is identified as the proximal beam module 28 while the beam module adjacent to the front end assembly 18 supporting the camera 26 is referred to as the distal beam module 30.

The beam module refers to the collective beam structure between the handle module 14 and the front-end module 18, and can be embodied as a single, unified beam structure or can be provided in multiple beams that are either permanently or removably connected to each other and to the other boom sections for use. The illustrated example shows two beam modules—an exemplary proximal beam module 28 and an exemplary distal beam module 30—proximal and distal referring to their relative position along the length of the positioner 12 from the proximal operator end of the system 10 to the distal camera end of the system 10. Additional beam modules can be added or a single beam module can be employed, but for ease of illustration and discussion, a two beam module example will be used.

Suspended from the remote end of the distal beam module 30 is the front end assembly 18, which can be made up of a pan/tilt support 32 from which is suspended a pan/tilt assembly 34 to which the camera 26 is mounted.

The remote camera positioning and control system is supported by various auxiliary systems 22 that can be mounted to the operator using a support garment such as the vest 20. The auxiliary systems 22 preferably include a battery pack 36, a VCR 38 or other video signal recording system, a motion control system 40 and a camera control unit 42. Monitoring of the video signals taken by the camera can be provided by a monitor on the vest 20. Preferably, the monitor is provided on goggles 44 that are worn by the operator so that the video image is constantly in the operator's field of view. The cabling 24 for connecting the various auxiliary systems can be linked to the various components of the boom 12 through one or more umbilical cords which are discussed more fully below. Thus, the illustrated embodiment having features according to aspects of the invention provides a completely self-contained, operator supported system for remotely positioning and controlling a camera out of the operator's reach. The boom 12 is designed to be sufficiently light weight to be held and maneuvered by the operator without ground support or other assistance while providing sufficient flexural rigidity against deflections induced by motion of the boom 12 and external forces such as wind and light structural impact.

Other features of the embodiment according to aspects of the invention include construction of the handle module 14. Preferably, the handle module 14 is equipped with a handle shaft 46 onto which a handle grip 48 is slidably and rotatably mounted. At the proximal end of the shaft handle, a proximal or rear handle assembly 50 is provided that includes at its proximal end a handle ring 52. The handle ring 52 provides an opening into a control cage 54 formed by a series of ribs 56 that surround a camera control, such as a joy stick unit 58. The handle ring 52 enables the operator to freely rotate the boom 12 with associated rotation of the camera 26. For this purpose, the handle grip 48 is preferably rotatably mounted on the handle shaft 46 so that the grip 48 can be held stationary in one hand and the handle shaft 46 and the associated, connected boom 12 can rotate relative to the stationary grip 48. Likewise, if the grip 48 is preferably mounted to also slide, the handle ring 52 can be used to translate the boom 12 axially relative to the stationary grip 48, thus providing axial translation of the camera 26.

The camera control, such as the joystick 58, can be configured to control pan and tilt of the camera 26. By superimposing the boom motions of rotation and axial translation on the pan and tilt motion of the camera 26, complex camera motions and resulting image dynamics can be achieved. The variations in camera positioning and motion achieved by these boom positioning and pan/tilt controls is further expanded by the ability to rotate the boom 12 relative to the handle grip 48 in a full 360° range of motion as well as transverse, vertical and angular translation of the boom 12 through the operator's arm and body movements as well as walking, or even running.

The essentially acrobatic maneuverability of the boom 12 and the associated camera movement and image dynamics can be achieved while minimizing camera image instability by providing a beam structure that is light weight yet provides relatively great cross-sectional flexural rigidity. Each beam module 16 is equipped with areas of concentrated stiffness spaced away from the neutral axis of the beam module cross-section. Preferably, these lines of concentrated stiffness are provided by longerons 60 that extend the length of the beam module 16. In the illustrated embodiment, a triangular cross-section is provided with a longeron 60 extending axially at each of the three corners of the triangular cross-section. Other cross-sectional geometries are possible including square and other polygonal shapes with longerons or other concentrated stiffening structure arranged along the corners of the polygonal shape.

In each beam section, the longerons 60 are preferably reinforced in a proximal region by anchor braces 62 that are constructed to increase the cross-sectional flexural rigidity of the beam 16. Each beam module 16 is also preferably constructed to provide a region of stabilizing webs 64 that, while providing less cross-sectional flexural rigidity, serves to maintain the spacing and parallel alignment of the longerons 60.

The beam modules 16 are preferably constructed to provide a first relatively high cross-sectional flexural rigidity at the proximal end of the proximal beam module 28 and decrease the cross-sectional flexural rigidity distally towards the camera 34. Along the length of the beam modules 16, the cross-sectional flexural rigidity can begin relatively high, for example, in the region of the anchor braces 62 of the proximal beam module 28 and then decrease to a second relatively lower cross-sectional flexural rigidity in the region of the stabilizing webs 64 of the proximal beam module 28. According to an aspect of the invention, the cross-sectional flexural rigidity can then increase in the region of the anchor braces 62 of the distal beam module 30 and again decrease to a fourth relatively lower cross-sectional flexural rigidity in the region of the stabilizing webs 64 of the distal beam module 30. While the illustrated embodiment is constructed to provide discrete anchor brace regions and stabilizing web regions, the beam modules can be provided with a continuous beam construction that transitions in cross-sectional flexural rigidity through variations in the cross-sectional design of the anchor braces, for example, by decreasing the thickness of the brace material, the material selected and the degree of reinforcement of the brace material, such as through decreasing degrees of reinforcing lamination of a substrate for the anchor brace materials. The stabilizing web regions of successive beam modules may also be of successively thinner or lower density material in order to achieve lengthwise variation of flexural rigidity and mass per unit length of the assembled positioner.

The front end assembly 18 is preferably constructed to provide the pan/tilt assembly support 32 formed to transition from the relatively strong and stiff corner points of the beam design in the case of the illustrated embodiment. These points of strength and stiffness are the three longeron regions of the triangular cross-section. The pan/tilt support assembly 32 transitions from the three points of the triangular beam cross-section to a bearing head 66 from which the pan/tilt assembly 34 and camera mount 26 can be suspended. Preferably, the camera 26 is positioned on the pan/tilt assembly 34 so as to be positioned on the neutral axis of the boom 12 through as great a range of motion as possible. Further details of the construction of the various modules and sections of the boom design and the associated auxiliary system are discussed in turn below.

Figure 2A:
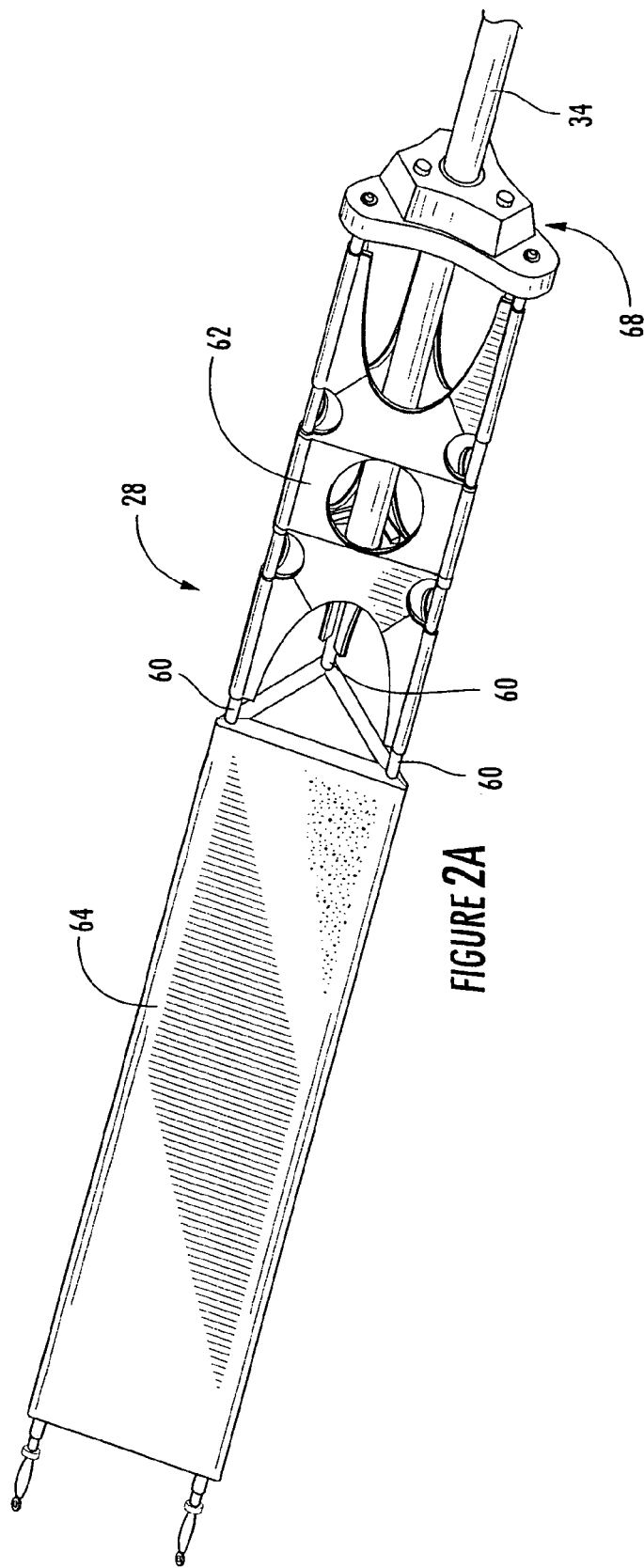
FIG. 2A is an example of a beam module, presenting features according to aspects of the invention.
Figure 2B:
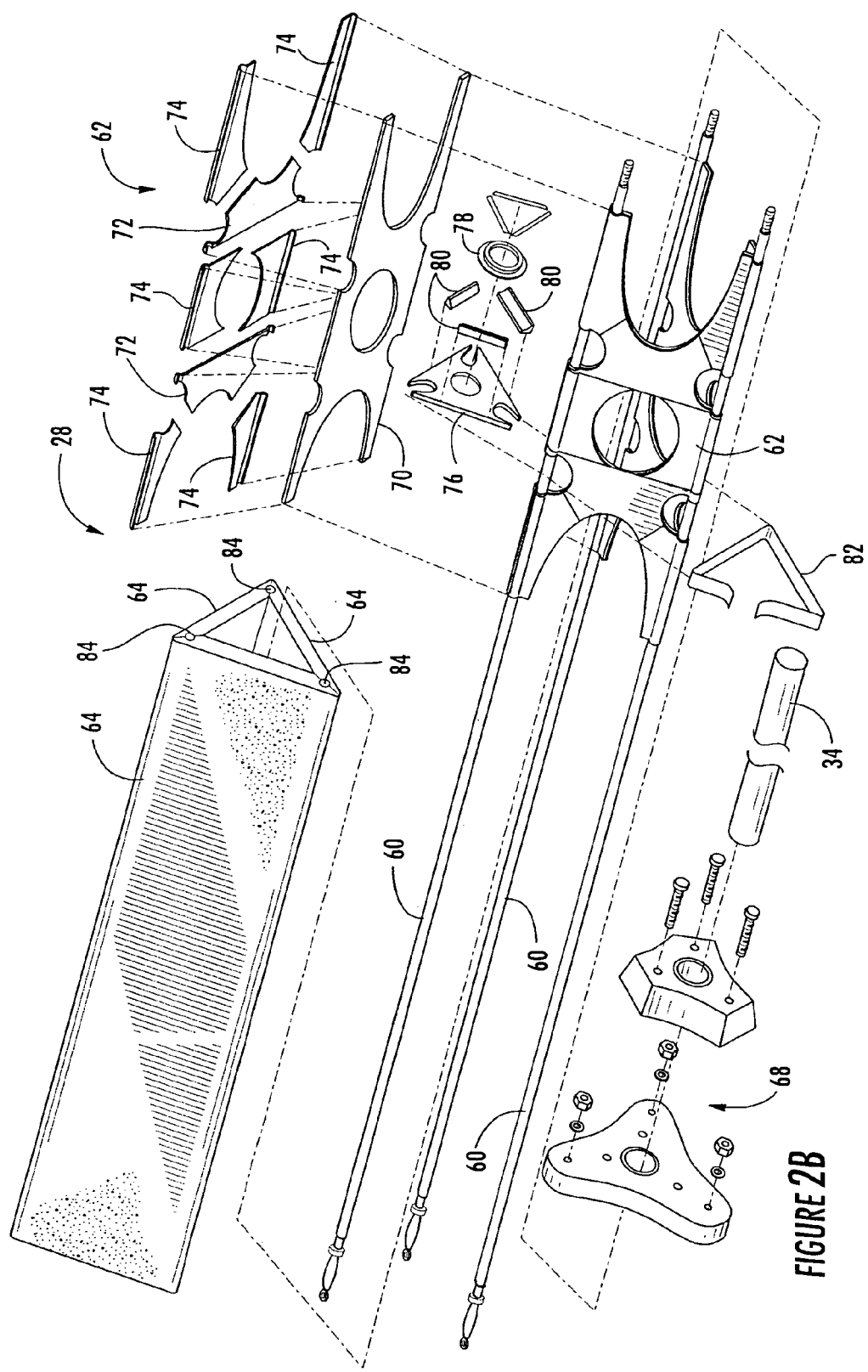
FIG. 2B is an exploded view of a beam module, presenting features according to aspects of the invention.

Referring to FIGS. 2A and 2B collectively, FIG. 2A shows the proximal beam module 28 assembled with a portion of the handle shaft 46 anchored to it. FIG. 2B provides an exploded view of portions of the proximal beam module 28. Because of its junction with a handle module, the proximal beam module 28 provides a base plate assembly 68 to be described in a later portion of this specification.

Each longeron 60 is located along an apex of the triangular cross-section. Each longeron 60 extends the length of the beam module 28. Each longeron 60 is preferably constructed as a "pull-truded" carbon fiber composite tube having an outer diameter of approximately ⅛-*inch* to ¼-inch, and a thick wall relative to the outer diameter. In the anchor brace region, the three longerons 60 are joined laterally by anchor braces 62. The anchor braces 62 can be constructed in a number of different manners provided they provide sufficient flexural rigidity for the beam 28. In the illustrated embodiment, the anchor braces 62 are constructed with 3-ply wood substrate 70 with primary grain extending parallel to the longitudinal axis of the beam module 28. Each anchor brace 62 is partially cut away to form a series of connected x-forms having curved edges. The x-forms are laminated in the center sections on both the exterior and interior faces with very thin, for example, 0.007-inch; pre-cured carbon fiber composite sheets 72 arranged with the major fiber axis transverse to the beam module length, using epoxy for bonding to the wood substrate 70. The anchor braces 62 are bonded in the regions adjoining the longerons 60 on the exterior face with a conformal applied layer of plain weave carbon fiber cloth and epoxy composite 74. The primary fiber axes of the conformally applied cloth are biased 45° relative to the longitudinal axis of the beam section 28 for maximum sheer strength and stability across the bond. Between the center regions of the forward or distal x-form is a handle tube terminal plate 76 preferably made of plywood with a ³⁄₃₂-inch thick 5-ply wood gusset 78 ground to a frusto-conical support profile with an outer diameter approximately ½-*inch* greater than the outer diameter of the handle tube 34. T*he* handle terminal plate 76 is bonded to the anchor braces 62 using hardwood cove dollhouse molding 80 and *epoxy*. T*he* triangular *cross-section* of the beam 28 is circumferentially bound with carbon fiber tow 82 and epoxy at the location of the handle terminal plate 76. I*n* the stabilizing web region of the beam module 28, which typically extends three to four times longer than the length of the anchor brace *region*, the longerons 60 are joined using webs 64 of a *low-density* material such as expanded polypropylene (EPP) having a greater thickness and lower density than the anchor braces 62.

The EPP panels 64 of the illustrated embodiment are provided with a beveled edge to join in a triangular configuration and are slotted with channels 84 to receive the tubular longerons 60. The EPP panels 64 can be connected using epoxy. The stabilizing web region is preferably constructed to provide uniformity along its length.

Figure 3:
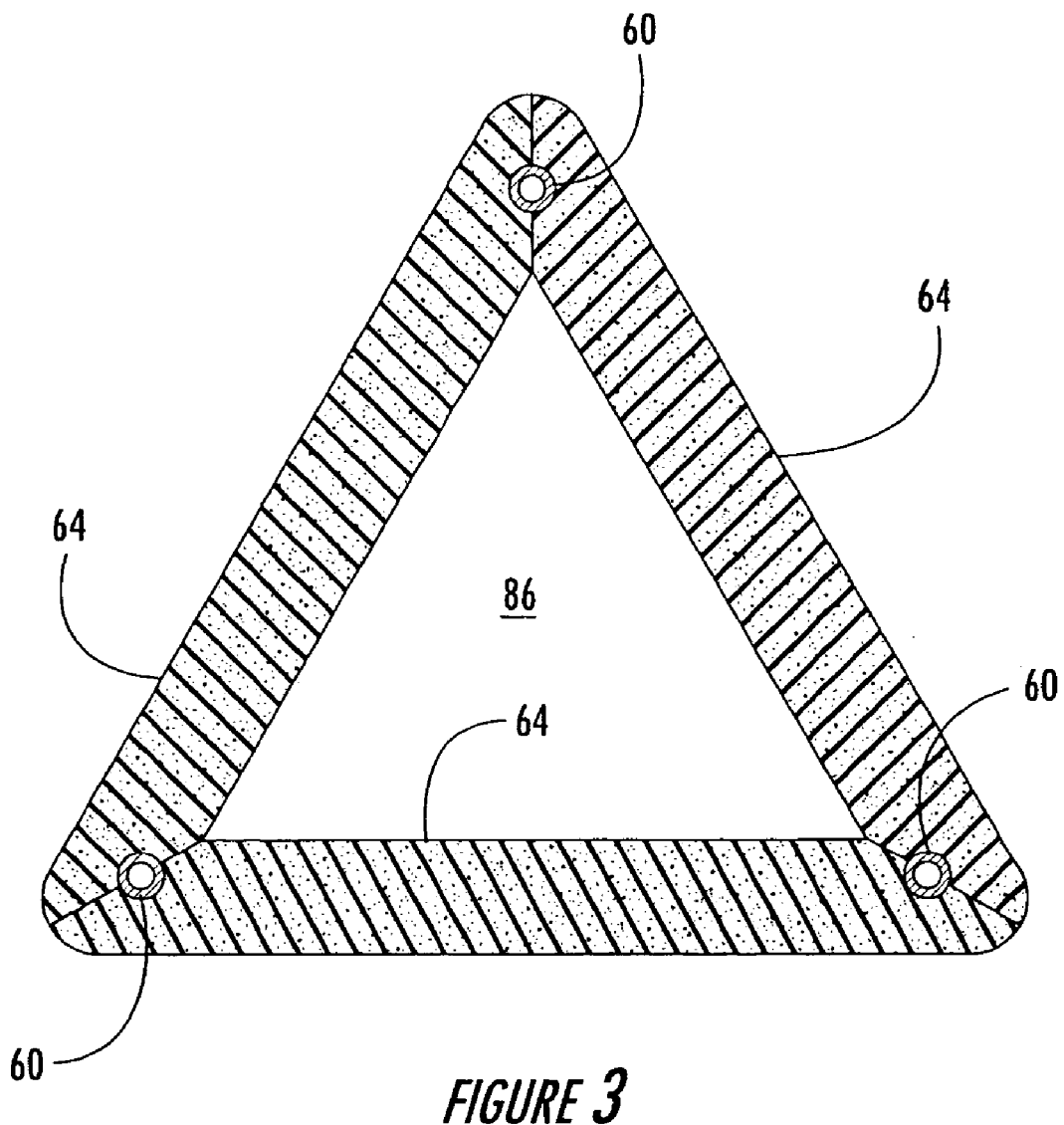
FIG. 3 is a cross sectional view of the example beam module taken at 3—3 in FIG. 1.

Referring to FIG. 3, the cross section of the stabilizing web region of the beam module 28 includes the pull-truded, composite, thick wall, tubular longerons 60 and EPP plate stabilizing webs 64, with a hollow center section 86 through which a system wire harness (not shown) is preferably routed as described in further detail later in this specification.

Referring to FIGS. 4A and 4B, the proximal beam module and distal beam module are preferably removably connected by junction of each of the three respective longerons. The longerons of the various beam modules can be removably inter-connected using any of a number of end rod connectors. According to one embodiment having features according to aspects of the invention, the longerons 60 can be connected using a clevis 88 and eye 70 arrangement. For example, each longeron of the proximal beam module can receive, within its hollow tube end, a knurled shaft end (not shown) of an end connector insert 92, bonded in place by epoxy (not shown), and can have a Kevlar thread lashing 94 about the exterior of the longeron end, preferably about the mid-length region of the bonded portion of the end connector 92. The end connector 92 can be equipped with an adjustable turnbuckle 96 having a series of adjusting nuts 98 for varying the length of the turnbuckle 96 and the associated end connector. The end connector 92 of the proximal beam module longeron can be formed as a flexible clevis 88 having a pin 100 between the flanges 102 of the clevis 88 that extends from one flange and removably fits into a recess 104 in the second flange. The longeron of the distal beam module can be similarly equipped with an end connector having an adjustable turnbuckle 98.

The end connector for the distal beam module longeron can be provided with a mating eye connector 90 for receiving and pivotally engaging the pin 100 of the flexible clevis 88. As shown in FIG. 4B, once the pin 100 of the clevis 88 is mated with the eye connector 90, the connection can be secured by a sliding collar 106 to retain the flexible flanges 102 of the clevis 88 in a closed position. Because the stability of the beam module is most dependent upon maintaining the longerons 60 in a substantially parallel arrangement, the lengths of the longerons 60 can be adjusted across a continuous range by the turnbuckles 96 to "fine tune" the relative lengths of the longerons 60 and the parallel arrangement resulting therefrom. Although a clevis-eye arrangement of connection has been disclosed, other rod end connectors are possible. It is also possible that the longerons can be continuous across the entire beam length. However, having separable beam modules enables selectivity in the length of the boom as well as the ability to break the boom down for storage, transport and repair. In this regard, it is preferred that the connectors are hand adjustable to minimize the need for tools, particularly in the field where adjustments and repairs may be necessary during use of the camera positioning system.

Figure 5:
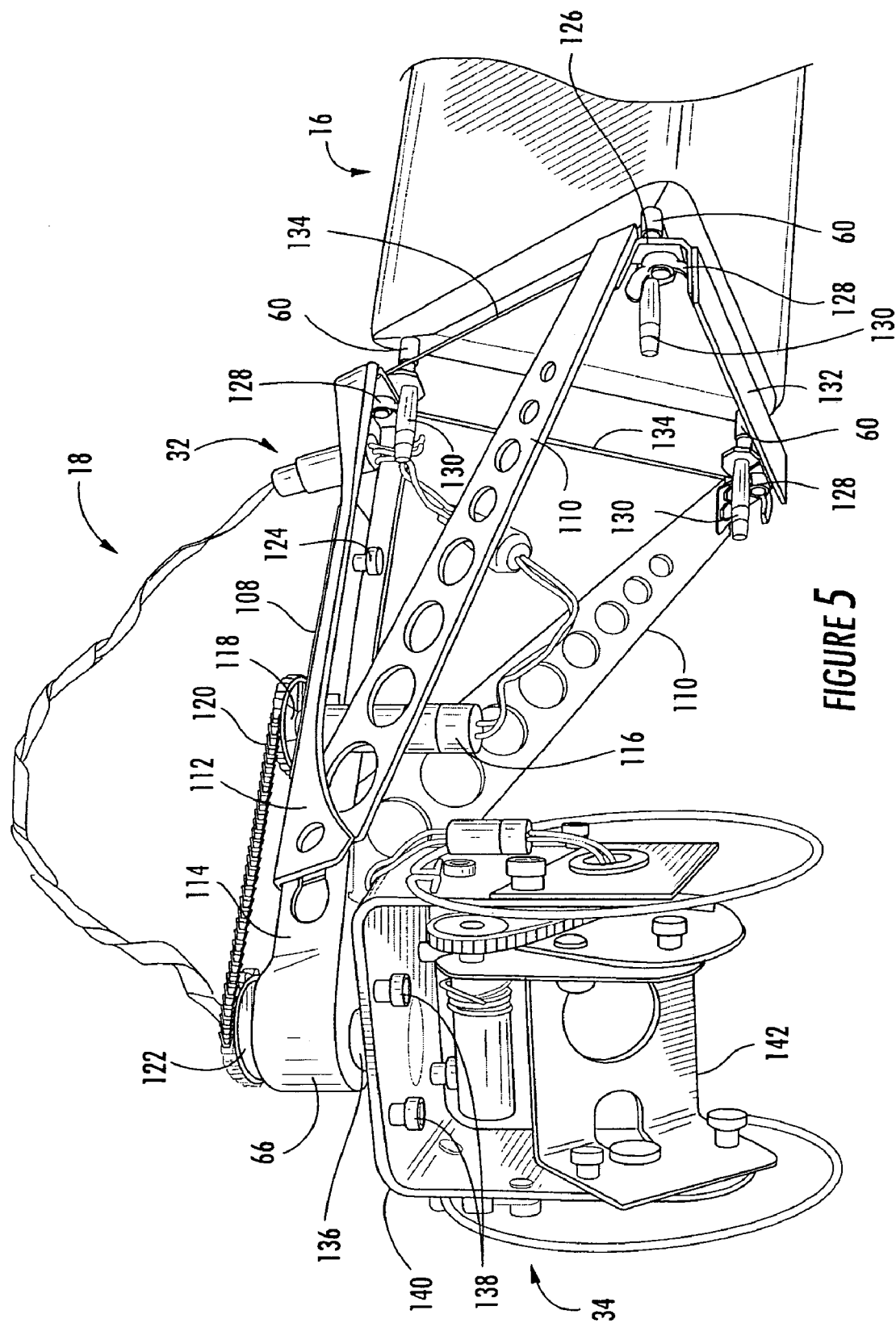
FIG. 5 is a distal perspective view of an example of a front end assembly, illustrating features according to aspects of the invention.

Referring to FIG. 5, an embodiment of a front end assembly for a camera positioning system having features according to aspects of the invention is shown. It is preferred that the front end assembly 18 include a pan/tilt support 32 that transitions from connection to the plurality of longerons 60 provided by the beam module 16 to a unified connection adjacent to the pan/tilt assembly 34. Additionally, it is preferred that the pan/tilt support 32 is arranged to present the pan/tilt assembly 34 and the camera mounted thereon (not shown, see FIG. 1.) substantially along the neutral axis of the beam 16 throughout as much range of motion of the camera as possible. To this end, the illustrated embodiment of a pan/tilt support 32 for the front end assembly 18 includes a tripod-like arrangement including a pan drive platform 108 and two pan/tilt support legs 110. The pan/tilt support legs 110 extend from an interface with two respective longerons 60 and join the pan drive support 108 adjacent the pan/tilt bearing head 66. The pan/tilt support legs 110 are preferably constructed of ⅛-inch low-density 3-ply wood core with the primary wood grain direction being substantially parallel to the length. Each leg 110 can be tapered and provided with a series of mass reducing cut-aways. Each pan/tilt support leg 110 is preferably reinforced with fiberglass epoxy laminated skin using ½-ounce per square yard satin weave cloth on a 45° bias and low viscosity "Z-Poxy" laminating resin, available from Pacer Technologies. Other laminating materials may be used in the skins to increase strength and stiffness. The legs 110 and their arrangement in the pan/tilt support 32 provide relatively strong and stiff support relative to weight, yet provide flexibility to absorb energy through out of plane bending and torsion before incurring significant damage.

The pan drive platform 108 is preferably arranged to extend from the remaining longeron 60 of the distal beam module to a junction with the pan/tilt support legs 110 and the bearing head 66. The pan drive platform 108 provides a substantially planar surface to which can be mounted various components of the pan drive, as will be discussed more fully below. The pan drive platform 108 is preferably constructed of a low-density 3-plywood core and reinforced by lateral support struts 112. The lateral support struts 112 are preferably parallel to the planes of the sides of the triangular distal beam module 16, each being substantially 60° out of plane with the pan drive platform 108. The lateral struts 112 in the platform 108 can be approximately ⅛-inch in thickness, which provides good stability and avoids the undesirable flexibility associated with thinner plates. Reinforcing lamination may also be utilized.

In order to position the pan/tilt assembly 34 and the camera mounted thereon in the area of the neutral axis while providing for rotation, pan and tilt movement, it is desirable for the pan/tilt assembly 34 to depend from the support 32. Accordingly, the pan/tilt support 34 of the illustrated embodiment preferably includes the pan bearing head 66 which joins the pan drive platform 108 and support legs 110 and provides an axis of rotation oriented substantially vertically in the arrangement of the boom illustrated in FIG. 5. The pan bearing head 66 preferably is constructed with a wood core composite shell with mounting flanges 114 to join with the support legs 110 and pan drive platform 108. The pan bearing head 66 is provided with an axial opening preferably of ¾-inch diameter for press fit engagement of a ¾ outer diameter bearing. Vertical grain balsa core, with 3/32 5-ply top and bottom wood face sheets that are epoxy bonded to the balsa core, is preferred. The resulting structure is shaped and machined, then conformally laminated with 1.4-ounce per square yard plain weave carbon fiber cloth and "Z-Poxy" laminating resin. The resulting structure provides a mass of approximately 10 grams yet bears essentially all the support forces of the pan/tilt assembly and remains substantially rigid. It provides a pivotal structure to transmit loads from the pan/tilt assembly 34 to the pan drive platform 108 and the pan/tilt support legs 110.

The pan bearing head support flanges 114 can be formed as a single unit with the pan bearing head 66 or can be separately fabricated and connected to the pan bearing head 66. The pan bearing head support flanges 114 are preferably constructed from 3/32-inch 5-ply wood partially laminated with an overlapping 1.4 ounce per square yard carbon fiber composite conformal lamination from the bearing head end and with "Z-Poxy" laminating resin. The pan bearing head support flanges 114 can also be provided with mass reducing circular cutaways. The pan drive for rotating the pan/tilt assembly 34 relative to the pan bearing head 66 is mounted to and supported by the pan/tilt support assembly 32 and in particular on the pan drive platform 108. The pan drive includes a pan drive motor assembly 116. Preferably, the pan drive motor assembly 116 includes a Faulhaber/MicroMo 1524 brush commutation coreless motor with a 152-to-1 gear box and an IE-512 quad encoder. Alternative motor assemblies can be utilized but high encoder count per output shaft revolution, high degree of programmability, compact size and low mass are preferred specifications, resulting in smooth motion control for panning the pan/tilt assembly without sacrificing positioner maneuverability.

The motor assembly 116 can be positioned on the platform 108 to provide its drive shaft substantially vertically. A pan drive sprocket 118 can be provided for transfer of the drive motor motion to the pan/tilt assembly through a pan drive chain 120 and a pan drive gear disk 122.

The pan drive sprocket 118 is preferably a Delran molded 6-spoke gear having a ¼-inch inner-diameter, 32 teeth and a 1.24-inch pitch diameter. The pan drive chain 120 is preferably a "Serve-O-L Link" chain C1227 made of Dupont Delran 500 acetyl resin. The chain 120 preferably has an approximately ⅛-*inch* pitch and can be approximately 92 links long for the illustrated embodiment. Alternative chain designs are possible, but important characteristics that have been identified include a low mass of plastic to avoid contributing to the inertia of the camera pointing motion and relatively weakly attached snap-together chain links that can serve as an over-torque protection for the relatively expensive drive assembly. Snapped together fastening of the links allows for damage-free disconnect in the event of external object strike, for example.

The pan axle gear disk 122 can be constructed in a number of ways but preferably is provided with a plastic gear ring on a central wood disk. The pan axle gear disk 122 preferably has a 32 teeth Delran gear ring surrounding a ⅛-inch thick 3-ply low-density ply wood core disk that friction fits onto the pan axle tube. Other polymers or composite molded, cast or cut or otherwise manufactured parts may also be utilized. The wood disk arrangement serves as a fail-safe clutch in case of drive over-torque conditions due to foreign object strikes, for example. The low mass of the plastic and wood gear disk 122 does not contribute significantly to the inertia of the pan/tilt motion and the plywood plate core can be laser cut or otherwise fabricated to very good tolerance and repeatability. The pan drive assembly preferably also includes a mounting and tensioning plate (not shown) along the top of the pan drive platform 108. The plate can be constructed as a composite with a plywood core and carbon fibers/fiberglass/epoxy skins. In one embodiment, a 1/32-inch thick 3-ply wood core is utilized with carbon fiber cloth of 1.4 ounce per square yard plain weave on a 45° bias, with a second skin of unidirectional, 3.5 ounce per square yard carbon fiber that is 0.006-inches thick and arranged with the fiber grains parallel to the major grain axis of the ply wood core. A third skin of the fiberglass cloth utilizing ½ ounce per square yard satin weave on a 45° bias can also be utilized. The matrix material can be a "Z-Poxy" laminating resin.

The pan drive mounting and tensioning plate can be adjustably mounted to the pan drive platform 108 utilizing a screw and thumb nut assembly 124 to slide the pan motor 116 relative to the pan axis for tensioning of the pan drive chain 120. Nylon screws are preferred for their low mass and hand adjustability.

At the proximal end of each of the pan drive platform 108 and the two support legs 110, an angle bracket 126 can be provided as one possibility for joining the pan/tilt support 32 to the distal beam module 16. Each angle bracket 126 can have a generally trapezoidal shape with angled side flanges for mounting to the support legs 110 and pan drive platform 108 using, for example, nylon bolts and nuts. Additionally, using preferably nylon bolts and wing nuts 128, a series of flat anchor plates can extend from the angle brackets 126 and provide an additional aperture for mounting onto the ends of the longerons 60. Each of the longerons 60 can provide, for the purposes of fastening, a threaded end that can be capped by any of a number of fasteners, including, for example, turnbuckles with jam nuts 130. The support legs 110 can be further braced laterally by a stiffening structure, such as a lateral stiffener 132, which is preferably constructed of 3-ply wood, although various thicknesses of plates and materials can be used as well. The triangular arrangement of the illustrated pan/tilt support assembly 32 can be further stiffened at its junction with the distal beam module 16 by thin carbon fiber wire 134 secured to the angle brackets 126 by thin gusset plates in each corner having a hole to match the bolt hole footprint of the angled brackets 126 and titanium mounting plates. The carbon fiber wires 134 are preferably 0.035-inch diameter carbon fiber epoxy pull-truded wire bonded to 1/32-inch thick 3-ply wood corner gussets using 1/2 ounce per square foot satin weave fiberglass cloth on a 45° bias and gap-filling, cyano-acrylate adhesive. Alternatively, various diameter rods, various thickness plates and various cross-sections of bulk low-density stiffening materials, such as balsa wood, may be employed. This stiffening arrangement helps maintain dimensional stability of the beam cross-section, thereby reducing unwanted deflection of the camera.

Referring again to the pan bearing head 66, an axle assembly 136 can be provided for permitting relative rotation of the pan/tilt assembly 34. Details of preferred components of the axle assembly 136 are discussed more fully below.

The pan/tilt assembly 34 is preferably secured to the axle assembly 136 of the pan bearing head 66 by a series of finger releasable nylon screws and nuts 138. The pan/tilt assembly 34 generally provides a channel-shaped pan carriage 140 which supports the entire pan/tilt assembly 34 and rotates relative to the pan/tilt support assembly 32. Nested pivotally within the pan carriage 140 is a tilt or camera carriage 142 which can rotate in the tilt plane relative to the pan carriage 140 under the actuation of a tilt motor drive assembly.

Figure 6:
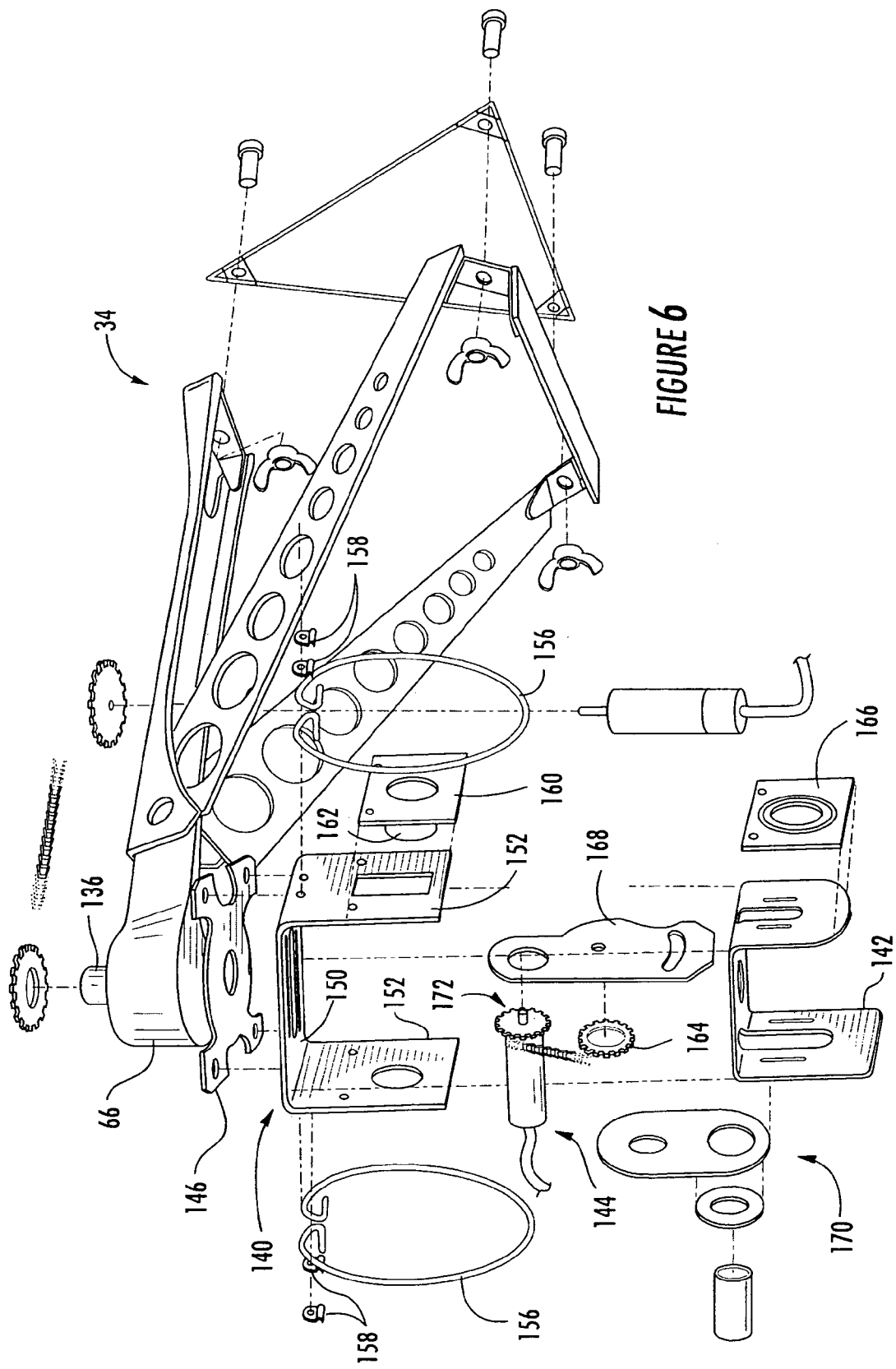
FIG. 6 is an exploded perspective view of an example of a pan/tilt assembly incorporating features according to aspects of the invention.

Referring to FIG. 6, an exploded view of an embodiment of a pan/tilt assembly 34 having features according to aspects of the invention is shown. The pan/tilt assembly 34 preferably depends from the pan bearing head 66 so that the combined center of mass of all portions of the system distal to the distal end of the distal beam module is positioned on the neutral axis of the beam throughout as much of its range of motion as possible. The pan/tilt assembly 34 can mount to a pan/tilt hanger plate 146 mounted on a pan axle tube 136 of the pan bearing head 60. The pan/tilt hanger plate 146 is preferably arranged as an x-form with four mounting wings, each having at least one fastener hole. The hanger plate 146 can be constructed with a 1/32-inch thick 3-ply wood core with 3-ply carbon fiber-fiberglass-epoxy composite laminations on each face.

The first ply is a plain weave lightweight carbon fiber cloth on an angled bias with respect to the primary wood grain direction of the plywood core. The second ply is unidirectional carbon fiber tow oriented in parallel to the primary wood grain direction. The third ply is preferably a satin weave fiberglass cloth of very lightweight, on a bias with respect to the primary wood grain direction of the core. The skin lamination stack sequence is the same on both sides of the hanger plate 146. The matrix material can be E-Z-Lam low viscosity, laminating resin, available, for example, through Aerospace Composite Products of San Leandro, Calif., U.S.A. The carbon fiber cloth of the first ply can be 1.4 ounce per square yard plain weave on a 45° bias. The second layer can utilize carbon fiber unidirectional cloth of 3.5 ounce per square yards and 0.006-inches thickness aligned parallel to the major grain axis of the plywood core. The fiberglass cloth can be 1/2 ounce per square yard satin weave on a 45° bias. Different weights of plain weave carbon fiber and fiberglass will give varying degrees of strength, stiffness and mass of the finished structure. Kevlar may also be added for increased toughness but is more difficult to cut.

The pan axle tube 136 is preferably constructed as a thin wall fiberglass epoxy composite having a 1/2-inch outer diameter with a series of selectable placement holes for a spring clip (not shown) that allows adjustment of the spacing of the hanger plate 146 relative to the pan bearing head 66 parallel to the pan axis. The axle 136 can be mounted to the pan bearing head 66 using pan axle bearings (not shown).

The pan carriage 140, as noted above, is preferably arranged as a channel form having a base 150 with two transverse flanges 152. The pan carriage 140 can mount to the pan/tilt hanger plate 146 preferably by a series of finger releasable nylon screws and thumb nuts (not shown). The base 150 of the pan carriage 140 has slotted holes for lateral positional adjustment of the pan/tilt assembly 34 with respect to the central or neutral axis of the beam for purposes of dynamic balancing, for example, to place the center of mass of the pan/tilt assembly 34 substantially coincident with the pan axis, thus substantially minimizing unwanted dynamic reaction forces from being applied to the pan/tilt support 32 and therefore to the beam structure of the positioner system as a result of pan motion. The pan carriage core is preferably constructed of a low-density 3-ply wood base 150 and standard density 3-ply wood flanges 152 mounted at right angles to the base 150, using epoxy bonded, hard wood cover, doll-housing molding, ground smooth to interfaces of the base 150 and flanges 152. The major grain axis of the base 150 and flanges 152 are preferably aligned in the hoop direction of the channel form. The radii of the inner and outer surfaces of the core channel form thickness are such that the thickness of the core is greater at corners than the thickness of the base 150 or flange plates 152. The plywood base 150 is preferably 1/8-inch thick along the base and 1/16-inch thick on the flanges 152. The greater thickness of the channel form at the corners increases bending strength and stiffness of the finished composite channel form structure and the use of plywood cores permits laser cutting and other computer numeric controlled manufacturing techniques to maintain tight tolerances and a high degree of repeatability. The pan carriage 140 can be provided with strengthening skin lamination similar to that described above with respect to the pan/tilt hanger plate 146.

The pan carriage 140 can be equipped with hoop-shaped bumpers 150 to protect the pan/tilt assembly 34 and the nested camera from impact with exterior objects. The bumpers 156 can be made of titanium wire and are preferably heat shrink tubing covered at the ends that are mounted to the pan carriage 140 with plastic brackets 158. The brackets 158 are preferably mounted adjacent the base 150 of the pan carriage 140 so as to transmit impact forces to the roots of the flanges 152 and reduce the resulting bending moments and the possibility of damage to the flanges 152 themselves or other critical and difficult to manufacture components nested within the pan carriage 140.

Depending from one flange 152 of the pan carriage 140 is an axle plate 160, having an axle tube 162 arranged normal to the plate 160 toward the interior of the pan carriage 140. This axle tube 162 has a support gusset ring on the opposite side of the plate from the axle tube. The axle plate 160 is mounted using hand adjustable fasteners that pass through slightly oversized holes in the plate, allowing for axial alignment of the axle plate and tube with the tilt bearing on the opposite flange of the pan carriage. The axle tube 162 passes through an oversized hole in the pan carriage flange 152 and supports the tilt drive gear disk 164, which is friction fit on the axle tube 162 after the axle tube 162 and plate 160 are attached to the pan carriage flange 152, as well as one of two tilt bearings which is also applied to the axle tube 162 after the axle tube 162 and plate 160 are attached to the pan carriage flange 152. The axle tube 162 allows passage of connectors and cabling for electrical components within the tilt assembly such as the camera detector and the tilt drive unit, as well as for lens articulation and lighting or microphone means, when used. On the opposite flange of the pan carriage 140 from the axle plate 160 is the other tilt bearing, press fit into a hole in that flange, which is also reinforced with a *frax*;3;32 inch thick 5-ply wood disk bonded to the flange.

Continuing with the components between the two flanges 152 of the pan carriage 140, the tilt bearing around the pan carriage-affixed axle tube and plate is press-fit into its own plate 166 which also has a bonded doubler ring composed of 3/32-inch thick 5-ply wood. This tilt bearing plate 166 is also attached to one flange of the tilt or camera carriage 142, using hand adjustable fasteners that pass through slightly oversized holes in the plate, allowing for adjustable axial alignment of the bearing plate with respect to the camera carriage 142. Specifically, the tilt bearing plate 166 is slidably adjustable in a direction parallel to the optical axis of the camera optics/detector assembly to allow the tilt axis to be made substantially coincident with the center of mass of the components that move with tilt motion, such as the camera optics and detector, the tilt drive 144, and lens articulation componentry and lighting fixtures when used. Also mounted to the other side of the same flange of the camera carriage is the tilt drive mounting plate 168, further described below.

On the opposite flange of the camera carriage 142 from the tilt bearing plate and the tilt drive components is fastened an axle tube and plate 170, similar to that previously described with respect to the pan carriage 140. This axle tube 170 passes through the previously described bearing that is fixed in the pan carriage flange 152. This axle tube and plate assembly 170 also attaches to the camera carriage 142 by hand adjustable fasteners that pass through slightly oversized holes in the axle tube and plate 170, allowing for adjustable axial alignment of the bearing plate with respect to the camera carriage 142. The adjustably positionable nature of this attachment means serves in conjunction with the similar feature on the other bearing of the camera carriage 142 to allow for dynamic balancing of the tilt components about the tilt axis, helping to substantially minimize unwanted dynamic reaction forces from being applied to more proximal structure of the positioner system as a result of tilt motion. Such dynamic balancing substantially minimizes pan/tilt motion-induced perturbation of the camera positioner structure, allowing less structure and therefore less mass within the positioner, a feature critical to the maneuverability and therefore also to the utility of the positioner.

To contribute to the compact sizing of the pan-tilt assembly 34, the tilt drive assembly 144 is preferably mounted to the tilt carriage 142 and drives rotation of the tilt carriage 142 relative to the pan carriage 140 by a sprocket gear chain assembly 172 that revolves with the tilt carriage 142 itself. The camera/tilt carriage 142 is constructed as a channel form but includes an aperture for the lens of the camera (not shown). The camera/tilt carriage 142 is preferably formed with a wood core and lamination arrangement similar to that described above with respect to the pan carriage 140, but using a relatively thinner 1/16-inch thick 3-ply wood base and 1/32-inch thick 3-ply wood flanges.

The tilt drive motor assembly 144 can utilize a DC motor with an encoder and gear box. Preferably, a Faulhaber/MicroMo Model 1516A with a 152:1 gear ratio and an IE512 Encoder provides the drive power. Preferred performance characteristics are the same as those described above with respect to the pan drive motor assembly, although the torque requirement for motion about the tilt axis is typically less than that for pan since the tilt motion componentry is of physically smaller dimension and is more compactly arranged about its axis of motion. The tilt drive motor assembly 144 is preferably secured to a mounting plate 168 that is, in turn, adjustably mounted on the interior of a flange of the tilt carriage 142. The tilt drive motor assembly mounting plate 168 can be formed by a 45 mm thin plate with a drive shaft opening and an arcuate slot for a chain tensioning adjusting screw. End grain balsa core or carbon fiber composite with a fiberglass lamination layer can also be used for the tilt drive mounting plate 168. The adjusting screws are preferably hand adjustable and can be selected as nylon screws with thumb nuts. The output of the motor rotates a tilt drive sprocket which is constructed similarly to the pan drive sprocket discussed above (See FIG. 5) but having 24 teeth. Both sprockets can optionally be equipped with a hub collar and hub sleeve adjusted with two set screws (not shown). This interior arrangement for the sprocket can provide a slip clutch function as a protection against over-torque.

The rotating sprocket is connected to the tilt drive gear disk by a tilt drive chain. The tilt drive chain can be similarly constructed as the drive chain utilized for the pan drive as discussed above in reference to FIG. 3. Similarly, the tilt drive gear disk can be constructed similar to the pan drive gear disk but having 24 teeth. The interior wood disk can be press fit into the plastic gear teeth ring to provide another fail-safe clutch in case of drive over-torque conditions.

Figure 7A:
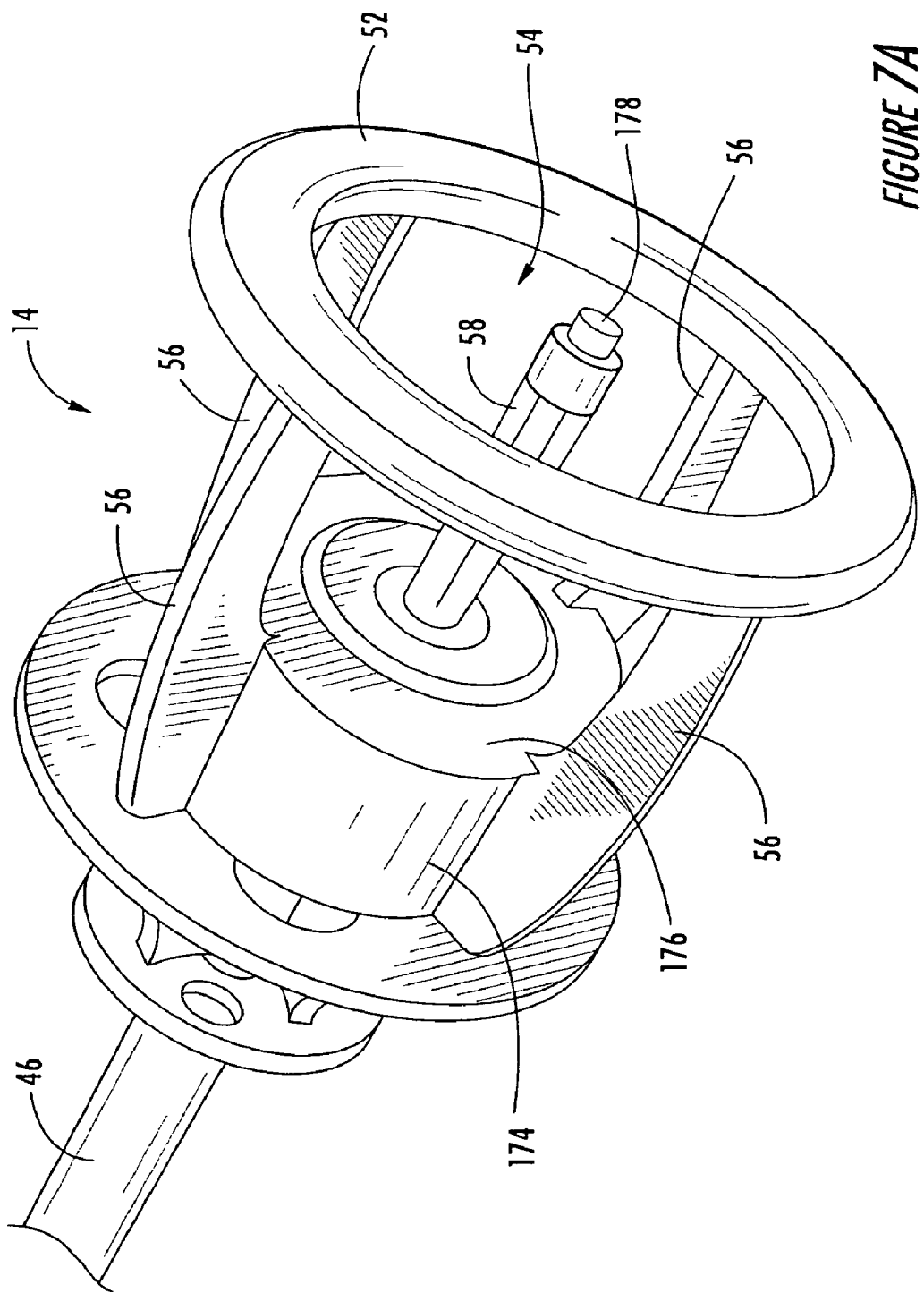
FIG. 7A is a proximal perspective view of an example of a handle assembly for use in a remote camera positioning and control system having features according to principles of the invention.
Figure 7B:
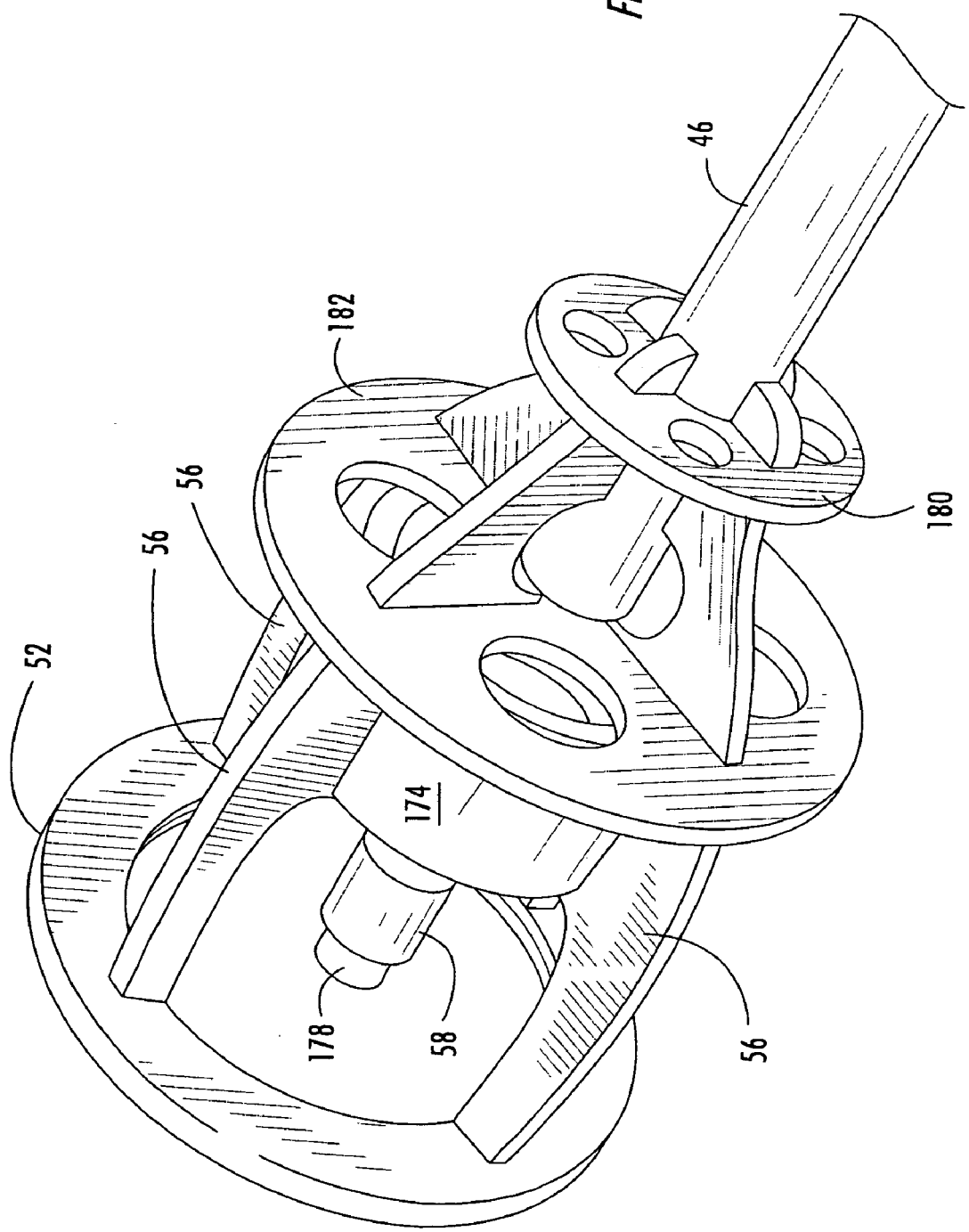
FIG. 7B is a distal perspective view of a handle assembly for use in a remote camera positioning and control system having features according to principles of the invention.

Referring to FIGS. 7A and 7B, the proximal end of the handle module 14 preferably includes a handle grip ring 52 that can be constructed as a circular ring suspended from the end of the handle tube 46. Alternative geometries for the ring are possible, but a circular arrangement is preferred for ease in handling by the operator in rotating the boom and holding the ring about its entire periphery without engaging a corner or other non-curved surface that may otherwise be experienced with a polygonal shape.

The grip ring 52 is preferably suspended from the end of the handle tube 46 through a series of ribs 56 that form a control cage 54 for surrounding and protecting a camera control unit such as the joystick unit 58. Any of a number of ribs can be provided, but as illustrated, four equally spaced ribs 56 can provide a protective cage for the joystick 58 while providing lateral openings for gripping of the ribs 56 as well as for alternative access to the joystick 58 in addition to the central opening in the ring 52 for accessing the joystick 58. The joystick 58 can be mounted inside a control enclosure housing 174 constructed of diagonally alternating biased sheer web made up of upper and lower rings of ¼-inch nominal width $1/16$-inch thick 3-ply wood and four quadrants between the cage ribs of $1/64$-inch thickness 3-ply wood cut with alternating 45° grain lines. The quadrants can be laid up against the rings and abutted to the ribs, tacked into position with cyano-acrylate adhesive and anchored thoroughly with epoxy. The joystick control can include control electronics in a base housing (not shown) that is enclosed within the control support housing 174 and removably secured by a control mounting plate 176 that covers the rear opening of the control support housing 174. The control mounting plate 176 can provide four slots through which the cage ribs 56 extend in preferably friction fit relation.

The juxtaposition of the joystick 58 relative to the handle ring 52 provides an ergonomic relationship enabling the user to easily control boom movement both axially and rotationally while simultaneously manipulating the joystick 58 for control of camera motion or other camera controls. The joystick 58 can be configured electronically to control pan and tilt or alternatively to control other aspects of the camera such as iris and focus control. The joystick 58 can be equipped with a push button actuator 178 at its end for such functions as pause/record control of the video recorder discussed more fully below.

Referring particularly to FIG. 7B, the handle tube 46 can be secured to the proximal handle assembly through a series of retaining rings, including a forward retaining ring 180 and a rear retaining ring 182. Each retaining ring 180, 182 can have mass reducing cutaways that can also provide additional grip services for the operator. Each retaining ring 180, 182 provides a central opening through which the handle 46 passes to terminate adjacent the control enclosure housing 174. Each of the proximal handle assembly components are made of a single sheet of low-density ¼-inch thick 5-ply wood with the exception of the end grip ring which is preferably made of two sheets of low-density ¼-inch 5-ply wood resulting in an end ring thickness of preferably ½-inch.

Figure 8:
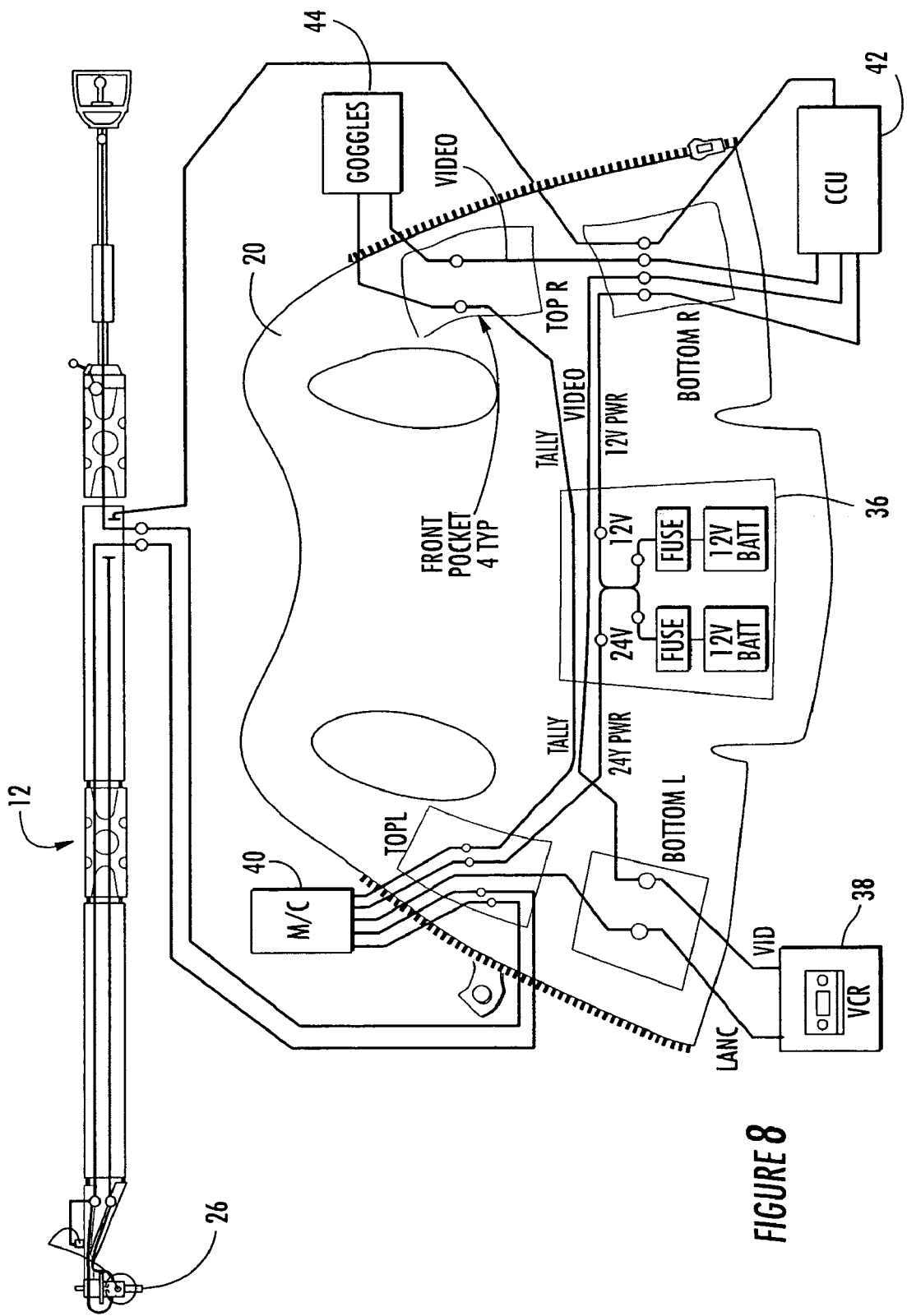
FIG. 8 is a schematic illustration of cabling and associated control sub-systems that can be used to provide features according to aspects of the invention.

Referring to FIG. 8, a general schematic of the cabling arrangement and the inter-connection of various auxiliary systems for supporting the camera boom and its camera and controls is shown.

The auxiliary support systems for the boom and camera include a video recording system such as a VCR 38 for receiving and storing video signal information from the camera 26 onto recordable media, such as tape, DVD or the like. The VCR 38 is preferably capable of recording the video signals in mini-DV format, such as the Sony GV-D900. Any number of other video recording systems are capable of use as long as they support the output format of the camera selected. The auxiliary systems can also include a motion control subsystem 40 for controlling the motor drive assemblies for pan and tilt. Preferably, the motion control system 40 includes a digital programmable motor controller such as the MicroMo-Faulhaber MCDC 2805 with a joystick interface circuit. This controller packaging can be housed with other control electronics for the joystick and can be enhanced with various customizable switches, indicator lamps and connectors to further integrate the auxiliary systems. The auxiliary systems also preferably include a camera control unit 42 such as the Toshiba IK-TU 40A CCU, which provides front panel controls and detector connectors, rear panel connectors and can provide broadcast quality control of camera image signals and engineering parameters.

Monitoring of the camera images is preferably provided by a monitor mounted to the operator to maintain the self-contained nature of the camera positioning and control system. While smaller monitors can be equipped on the operator's body, monitor goggles 44 such as the Sony PLM-A35 are preferred in that they provide the camera imaging directly in the operator's field of view at all times. While some of the components such as the goggles 44 and the VCR 38 are preferably supplied with their own dedicated battery, other components can be supplied by a battery pack subsystem 36. Because some of the components require 24-volts while others specify 12-volts, a 24-volt battery bank with appropriate safety fuses can be wired to provide a 12-volt terminal for appropriate routing to the auxiliary systems.

The various auxiliary systems are preferably mounted to the operator using a support system garment such as the vest 20. The vest 20 can be equipped with multiple pockets each sized to securely house the respective components. The battery packs 36 are preferably positioned in a pocket on the rear of the vest 20 and the cabling, interconnecting the various components to each other and, through umbilical cables, to the boom 12, can be routed through the vest 20. Optionally, the vest 20 can be equipped with various openings on the interiors of the pockets and preferably routing sleeves to contain the cabling along the interior of the vest 20 to avoid entanglement and damage to the cabling and potential harm to the operator.

The various auxiliary subsystems and the associated components on the camera boom 12 can be interconnected by various cabling. The proximal joystick control 58 is preferably connected to the auxiliary subsystems through a 9-conductor bundle terminated with a set of three Fatuba-J male and RS232 9-conductor IDC Canon D connectors. The cabling from the proximal joystick 58 extends along the interior of the hollow handle tube and connects to the umbilical cables at a break out junction along the proximal beam module. This joystick control cabling can also provide an additional break out for optional connection to a distal joystick controller discussed more fully below. At the beam junction, the motion control cables can connect to the auxiliary systems on the vest through an umbilical cable preferably configured as an RS232 9-conductor extension which extends to the motion control box 40.

The motion control drive cabling from the motion control box 40 to the pan and tilt drives is preferably constructed as a 15-conductor ribbon cable terminated with an RS232 15-conductor IDC technology Canon-D type connector. A tilt drive motor extension cable can extend from the junction between the motion control drive cable and the tilt drive motor assembly. The tilt drive control cable extension can also be formed as a ribbon cable having six conductors terminated with twin Fatuba-J connectors.

The camera detector cabling for routing the camera controls and video signals from the camera unit 26 to the camera control unit 42 is preferably provided by a Hirosi threaded coupling, round connector providing twenty pins and providing a continuous cabling along the length of the boom and continuing as a camera umbilical to the camera control unit 42 on the operator vest 20. The battery pack cabling is preferably arranged to provide ground and plus-24-volt taps as well as a center tap for plus-12-volts. Airtronics connectors joined for 12 and 24-volt break outs with voltage taps separately keyed by either the second or third pin of the three pin connectors is preferred to provide a fail-safe against improper power connections to the auxiliary components. To avoid danger and potential serious injury to the user, the batteries 36 are preferably fused in the event that a misrouting of the power causes battery overload or some other condition endangering the operator.

A 24-volt motion control box power extension cable can be provided and is preferably constructed as a 22-gauge conductor with a mating keyed power connector at the motion control back panel, having shield to ground and an Airtronics connector at the battery end. Other cabling arrangements are possible but must preferably be able to handle 4 amps continuous.

A 12-volt camera control unit power extension can also be provided and constructed with an Airtronics connector on the battery end and a Hirosi 4-pin power connector on the camera control unit end. Alternative cabling is possible.

The video signal routed to the camera control unit is then transmitted to the VCR 38, preferably using S-video cabling. The video signal feed is also provided to the monitor goggles 44 and is preferably routed through RCA video cabling with an appropriate adaptor.

Figure 9:
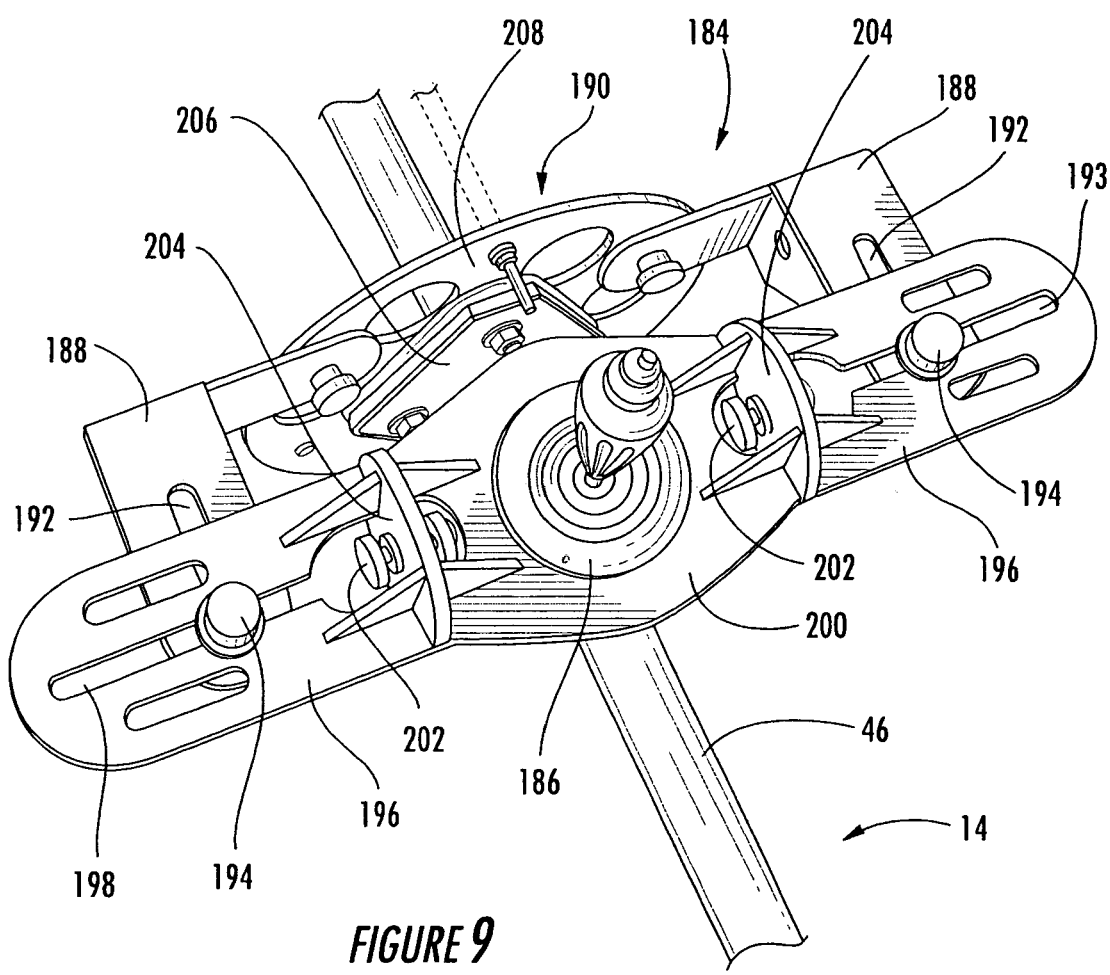
FIG. 9 is a perspective illustration of a forward control assembly that can be used to provide features according to aspects of the invention.

The goggles 44 are preferably equipped with a tally lamp to monitor the pause/record status of the VCR 38. If the goggles 44 are equipped preferably with a two color LED, indicating various VCR status, then a 3-conductor AWG #26 jacketed cabling terminated at the goggles end with a two color LED red and green connected by a Fatuba-J connector from the back panel of the motion control box is preferred. VCR record and pause can be controlled, for example, through the joystick 58 by way of the motion control box. The motion control panel can provide a control signal to the VCR 38 through LANC cabling according to established LANC protocol. Referring to FIG. 9, the handle module 14 can optionally be equipped with a distal or front joystick control 184 in addition to, or instead of, the proximal joystick control 58 (SEE FIG. 7A). The camera motion or camera operation can then be divided up between the forward and the rear joystick controls 184, 58. For example, one joystick can control tilt while the other controls pan. Alternatively, one can be dedicated to both pan and tilt control while the other is dedicated to focus and aperture controls. The joystick 186 can be selected for any of a number of available joystick controls but can preferably include a subminiature two axis-3 channel (2 proportional and 1 switch) joystick system available through CH Products. The distal joystick assembly 184 can include a pair of joystick mounting brackets 188 depending, for example, from the base plate assembly 190 described later in this specification, each comprised of a series of wood plates including a ⅛-inch thick standard density 5-ply, a ¼-inch thick low-density 5-ply, and slotted ⅛-inch thick standard density 5-ply plate which are epoxy bonded at right angles, with the outboardmost plate of the brackets in a horizontal plane with respect to the beam, normal to the pan axis and having ¼-inch wide slots 192 parallel to the longitudinal axis of the beam to allow longitudinal positional adjustment of subsequent structure depending from the horizontal plates by means of ¼-inch nylon thumb screws and thumb nuts 194. A second pair of laterally adjustable plywood plates 196, preferably constructed of ⅛-inch standard density 5-ply in the horizontal plane, each having a triplet of parallel ¼-inch slots 198 configured in the lateral direction with respect to the length axis of the beam, depend from the above mounting brackets and allow for lateral and rotational adjustment within the horizontal plane. The second pair of plates 196 have a joystick mounting fixture 200 located between them. The fixture 200 is also preferably constructed of ⅛-inch standard density 5-ply wood and depends from the laterally adjustable plates 196 by means of ¼-inch nylon thumb screws and thumb nuts 202 through vertically oriented plates 204, also ⅛-inch standard density 5-ply, preferably located at each end of the joystick mounting fixture 200 to allow tilting adjustment of the joystick mounting fixture 200.

The base plate assembly 190 can include a pair of plates. The proximal base plate 206 as illustrated is preferably constructed of one layer of ¼-inch standard density 5-ply wood with three thin walled stainless steel inserts, each having an inner diameter for size #8 clamping bolts evenly circumferentially spaced around a close tolerance friction fit ⅞-inch diameter central aperture for the handle tube and reinforced by plain weave E-glass fiberglass skin lamination on a 45° bias to the vertical center line of the piece on both faces with a matrix of "Z-Poxy" laminating resin and hardener having a 1-to-1 room temperature cure, available from Pacer Technologies. The forward, larger base plate 208 is preferably made of ⅛-inch thick standard density 5-ply wood with three thin walled steel inserts in a hole pattern matching those of the smaller base plate, three thick walled aluminum inserts having oversized clearance inner diameters for the beam module threaded rods and a hole pattern to match that of the beam module terminal inserts. The forward base plate 208 also includes a close tolerance, friction fit, ⅞-inch diameter hole for the handle tube and six large, evenly spaced, mass reduction, three clearance holes for ¼ inch diameter fasteners evenly spaced around the perimeter (*preferably* 16 millimeters on center from the edge of the plate) for mounting control componentry such as the forward joystick assembly, and plain weave E-glass fiberglass skin lamination on a 45° bias to the vertical center line of the piece on both faces, with a matrix of "Z-Poxy" laminating resin.

Although specific details for the construction and operation of various components having features according to aspects of the invention have been set forth in the above specification, such disclosure is intended only to enable one skilled in the art to make and use the various components and assemblies relating to the subject matter of the invention and to disclose various preferences that the inventor had at the time of filing an application for patent. This disclosure is not intended to limit the scope of the invention, and various alternatives for the components and assemblies are likely to be readily apparent in view of this disclosure. Accordingly, the scope of the invention should not be determined from the above detailed description but rather from a reading of the following claims and the various definitions of the subject matter of the invention that they set forth.

I claim:

1. A remote camera positioning system for use and support by a sole operator, comprising:
    a camera;
    a camera positioner having a distal camera mount for supporting said camera, said camera positioner having a proximal operator interface to enable an operator to support said camera positioner and spatially maneuver said camera through said camera positioner; and
    said positioner including at least one elongated beam module, said beam module being positioned distally of the operator interface and proximally of the camera mount;

wherein the proximal operator interface includes a handle module, said handle module including a handle shaft extending proximally from the beam module and a handle grip moveably mounted on the handle shaft.

2. The system according to claim 1, wherein the handle grip is slidingly mounted on the handle shaft.

3. The system according to claim 1, where the handle grip is rotatably mounted on the handle shaft.

4. The system according to claim 1, wherein the handle shaft is both slidingly and rotatably mounted on the handle shaft.

5. The system according to claim 1, wherein the handle module further includes a grip ring mounted adjacent a proximal terminus of the handle shaft for rotating the positioner.

6. The system according to claim 5, wherein the handle module further includes a handle grip rotatably mourned on the handle shaft, whereby the handle grip can be held stationary as the handle shaft is rotated through the grip ring.

7. The system according to claim 6, wherein the handle grip is also slidingly mounted on the handle shaft, thereby permitting selective axial translation of the positioner relative to the handle grip and rotation of the positioner through the handle grip ring.

8. The system according to claim 7, wherein the handle module includes a manual control for at least one of camera tilt and camera pan and a control cage at its proximal end, said control cage providing a hollow interior, said camera control being placed in the hollow interior of the control cage but accessible by the operator's hand while interfacing with the positioner.

9. The system according to claim 8, wherein the camera control includes a joystick.

10. The system according to claim 8, wherein the control cage is defined by peripherally spaced ribs operatively connected to the handle shaft, said ribs providing gaps between them and an open proximal end.

11. The system according to claim 10, wherein a proximal handle grip caps and joins the proximal ends of the ribs and defines an opening within the grip that permits access into the proximal open end of the control cage.

12. The system according to claim 1, wherein the handle shaft is securely fixed to the beam module.

13. The system according to claim 12, wherein the beam module includes at least one base plate at the proximal end of an anchor brace region and a handle terminus plate more distally within the anchor brace region, said handle being secured by said base plate and said handle terminus plate.

14. The system according to claim 12, wherein the beam module includes a base plate assembly, said base plate assembly including a proximal plate and a distal base plate compressing a foam pad to fix the base plates against translation along the handle shaft through friction fit with the expanded foam, said base plate assembly being adjustably compressed by at least one of hand and tool.

15. The system according to claim 14, wherein one of the proximal base plate and the distal base plate is larger than the other, the larger one providing mass reducing holes that also provide additional operator interface surfaces.

16. The system according to claim 15, wherein the handle module further includes a distal manual control for controlling one of pan and tilt, and an adjustable camera control mount connected to the base plate, said second manual control being mounted to the camera control mount and positionally adjustable relative to the handle shaft by at least one of hand and tool.

* * * * *